Aug. 5, 1924.
A. D. PURTLE
1,503,554
ADJUSTABLE STUFFING BOX CASING HEAD CLAMP
Filed May 19, 1922
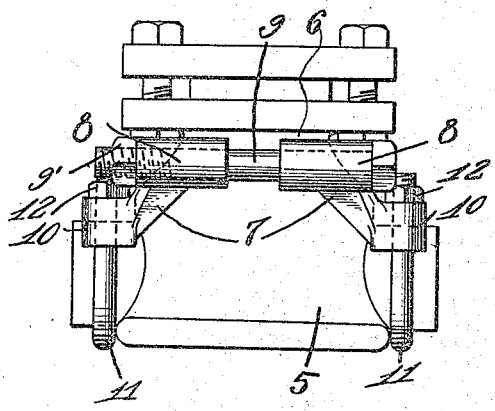
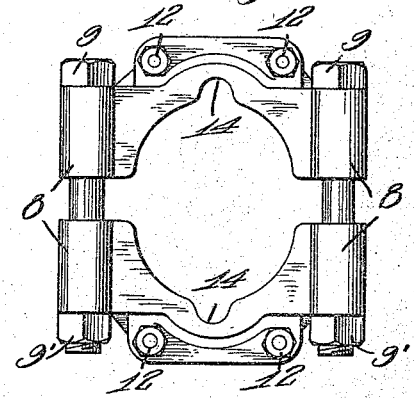
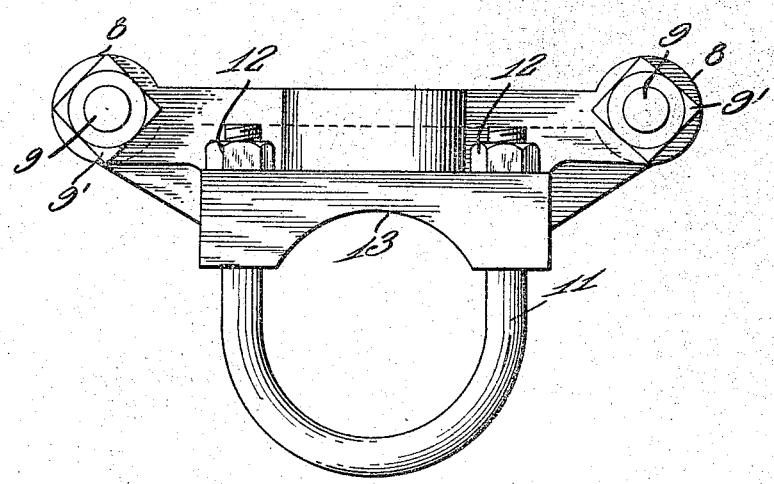

Patented Aug. 5, 1924.

1,503,554

UNITED STATES PATENT OFFICE.

ALBERT D. PURTLE, OF MARIETTA, OHIO.

ADJUSTABLE STUFFING-BOX CASING-HEAD CLAMP.

Application filed May 19, 1922. Serial No. 562,258.

*To all whom it may concern:*

Be it known that I, ALBERT D. PURTLE, a citizen of the United States, residing at Marietta, in the county of Washington and State of Ohio, have invented a new and useful Adjustable Stuffing-Box Casing-Head Clamp, of which the following is a specification.

This invention relates to adjustable clamps, the primary object of the invention being to provide a clamp of this character which is capable of adjustment to adapt the same for use in connection with casing heads of various diameters.

Another object of the invention is to provide a clamp of this character which may be readily and easily applied to casing heads and one which will efficiently connect the stuffing box to the casing head.

With the foregoing and other objects in view which will appear as the descripton proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a clamp disclosing the same as applied to the casing head and stuffing box.

Figure 2 is a plan view of the clamp.

Figure 3 is an elevational view of the clamp.

Referring to the drawing in detail, the reference character 5 designates the well casing head to which the stuffing box 6 is secured, the clamp forming the subject matter of the invention includng an upper member formed of opposed sections 7.

Each of these sections is curved to conform to the curvature of the stuffing box 6 and as shown, is provided with lateral tubular members 8 to accommodate the bolts 9, nuts 9' being provided on the threaded ends of the bolt, whereby the sections may be moved with respect to each other to adjust the opening therebetween, adapting the device for use in connection with casing heads of various diameters.

A base portion 10 forms a part of each section and is formed with suitable openings to accommodate the U-bolts 11 associated therewith, which U-bolts embrace portions of the well casing head, as clearly shown by Figure 1 of the drawing, whereby the stuffing box will be held against movement with respect to the well casing head. Nuts 12 are provided on the upper ends of the U-bolts, whereby the U-bolts may be clamped into position to restrict movement thereof.

As clearly shown by Figure 3 of the drawing, the lower portion of each section is curved as at 13 to conform to the curvature of the well casing head 5 and further insure a close-fit between the well casing head and stuffing box.

Formed on the upper surface of each section is a cut away portion indicated at 14, which cut away portions provide clearances for the stuffing box bolts.

Having thus described the invention, what is claimed as new is:

1. A clamp including opposed sections, each of said sections having horizontally disposed tubular members, bolts positioned within the tubular members for adjusting the sections with respect to each other, a U-bolt carried by each section and adapted to embrace a well casing head, and each section having a curved portion adapted to fit over the well casing head.

2. A clamp including opposed sections, means for securing the sections to a well casing head, and means for adjusting the sections laterally with respect to each other.

3. A clamp including opposed sections, bolts having connection with the sections for adjusting the sections with respect to each other, each of the sections including a downwardly extending portion having openings, U-bolts adapted to embrace a well casing head and having their upper ends extended through the openings to secure the sections to the well casing head, and said sections having cut out portions formed in the upper surface thereof.

In testimony that I claim the foregoing as my own, I have hereto affixed my signature in the presence of two witnesses.

ALBERT D. PURTLE.

Witnesses:
R. M. NALL,
H. J. McCOY.